(12) United States Patent
Geiszler et al.

(10) Patent No.: US 6,611,198 B1
(45) Date of Patent: *Aug. 26, 2003

(54) ELECTRONIC READER FOR READING A SPECIAL CHARACTERISTIC OF AN OBJECT

(75) Inventors: Kenneth J. Geiszler, San Jose, CA (US); Russel E. Walker, San Jose, CA (US); Kenneth Alan Whiston, San Jose, CA (US); Jon Kwong, San Jose, CA (US); Dale Lindseth, San Jose, CA (US)

(73) Assignee: Keri Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/411,141

(22) Filed: Oct. 1, 1999

Related U.S. Application Data (63) Continuation-in-part of application No. 09/138,589, filed on Aug. 21, 1998, now Pat. No. 6,411,199.

(51) Int. Cl.⁷ .............................................. H04Q 5/22
(52) U.S. Cl. ............... 340/10.41; 340/10.3; 340/10.33; 340/10.4; 340/10.1; 340/825.69; 340/825.72; 340/825.58; 340/5.2; 375/323; 375/147; 375/260
(58) Field of Search ............... 340/10.41, 10.1, 340/10.33, 10.3, 10.34, 10.4, 10.42, 10.5, 10.52, 825.69, 825.72, 825.58, 5.2; 375/323, 147, 260, 349, 51; 342/98, 102; 455/205, 207, 303, 304

(56) References Cited

U.S. PATENT DOCUMENTS

| | | | |
|---|---|---|---|
| 4,353,064 A | 10/1982 | Stamm | 340/825.31 |
| 4,364,043 A | 12/1982 | Cole et al. | 340/825.54 |
| 4,546,241 A | 10/1985 | Walton | 235/380 |
| 4,650,981 A | 3/1987 | Foletta | 235/449 |
| 4,730,188 A | 3/1988 | Milheiser | 340/825 |
| 4,737,967 A * | 4/1988 | Cahalan | 375/223 |
| 4,818,855 A | 4/1989 | Mongeon et al. | 235/440 |
| 5,028,918 A | 7/1991 | Giles et al. | 340/825.54 |
| 5,041,826 A | 8/1991 | Milheiser | 340/825.54 |
| 5,166,676 A | 11/1992 | Milheiser | 340/825.54 |
| 5,175,418 A | 12/1992 | Tanaka | 235/439 |

FOREIGN PATENT DOCUMENTS

| | | | |
|---|---|---|---|
| EP | 0 569 131 | 4/1993 | G06K/19/07 |
| EP | 0 758 777 | 2/1997 | G07F/7/10 |
| WO | WO 87/03119 | 5/1987 | B08B/13/24 |

OTHER PUBLICATIONS

"Aircraft Internal Time Division–Command/Response Multiplex Data Bus", Sep. 21, 1978, Department of Defense, Mil–Std–1553B, pp. i–34.

(List continued on next page.)

*Primary Examiner*—Nina Tong
(74) *Attorney, Agent, or Firm*—Thelen Reid & Priest LLP; David B. Ritchie (57) ABSTRACT

An object identification system and method detects the presence of a target object in a field of inspection and in one aspect of the invention, generates a first signal if the object is left in the field of inspection for more than a minimum threshold period of time. In a second aspect a second signal is generated if the object is introduced to the field of inspection more than a minimum threshold number of times (having been withdrawn from the field of inspection in the interim) within a minimum threshold period of time.

10 Claims, 10 Drawing Sheets

U.S. PATENT DOCUMENTS

| | | | |
|---|---|---|---|
| 5,268,670 A | 12/1993 | Brasch et al. | 340/541 |
| 5,382,952 A | 1/1995 | Miller | 340/825.54 |
| 5,471,203 A | 11/1995 | Sasaki et al. | 340/825.31 |
| 5,491,471 A | 2/1996 | Stobbe | 340/825.34 |
| 5,521,602 A | 5/1996 | Carroll et al. | 342/50 |
| 5,600,683 A | 2/1997 | Bierach et al. | 375/363 |
| 5,831,533 A * | 11/1998 | Kanno | 340/5.64 |
| 5,848,355 A * | 12/1998 | Rasor | 455/260 |
| 6,411,199 B1 * | 6/2002 | Geiszler et al. | 340/10.1 |

OTHER PUBLICATIONS

"CMOS Manchester Encoder–Detector", Mar. 1997, Harris Semiconductor, HD–15530, File No. 2960.1, pp. 5.140–5.152.

"Contactless Programmer Interface Protocol", 1997, Microship Technology, Inc., TB019, DS91019A, pp. 1–3.

"Contactless Programmable Passive RFID Device with Anti–Collision", Jul. 1997, Microchip Technology, Inc., MCRFF250/350.

* cited by examiner

ELECTRONIC READER FOR READING A SPECIAL CHARACTERISTIC OF AN OBJECT

CROSS-REFERENCE TO RELATED APPLICATIONS

This application is a Continuation-In-Part of U.S. patent application Ser. No. 09/138,589 entitled "RADIO FREQUENCY IDENTIFICATION SYSTEM" filed on Aug. 21, 1998, now U.S. Pat. No. 6,411,199, in the name of inventors Kenneth Geiszler, Russell E. Walker, Kenneth Whiston, Jon Kwong and Dale Lindseth and commonly assigned herewith.

BACKGROUND OF THE INVENTION

1. Field of the Invention

The present invention is directed to systems for access control and object identification. More particularly, embodiments of the present invention are directed to radio frequency (RF) identification systems employing an electronic transponder and a transponder reader which emits an RF interrogation signal at a first frequency which powers the electronic transponder and enables it to transmit a response on a second frequency (usually a lower frequency). More particularly, the system is used to read a characteristic of an object such as the electronic transponder using a Radio Frequency Identification (RFID) System, such reader employing a detector to detect the presence of the object within the field of inspection and generating a first signal in response thereto. Such systems are used in a number of fields including access security, object identification, inventory control, and generally any field where a small transponder unit may be associated with an object and remotely probed and read by a radio frequency transmission emitted by a transponder reader.

2. The Background Art

Radio frequency identification systems are well known in the art. Such systems are commonly in use in building access schemes where an authorized user of the building is given a building access card containing an authorization code number stored and optionally encrypted on the card as a binary string of data. The card is then presented to an transponder electronic reader which continuously transmits an RF interrogation signal. The card containing a transponder object receives the continuously transmitted signal from the electronic reader, uses it to power circuitry on board the card object, modulate an RF carrier signal having a different frequency (usually lower) from that of the RF interrogation signal received from the reader (typically an integer fraction of the RF interrogation signal frequency, e.g., ½, ⅓, ¼, etc.) with an identification signal stored on the transponder object and containing an authorization code number, and the transponder electronic reader then reads the identification signal emitted from the transponder object and passes the authorization code number to an appropriate controller for determining whether or not the authorization code number received is sufficient to allow the user access to the building. If the authorization code number is sufficient, generally a lock will be opened enabling a door to be opened and optionally a computer will log the entry for future reference.

Other implementations of such systems enable object identification by reading a transponder attached to or embedded in the special characteristic of an object (e.g., cargo identification, pet identification, taxi identification at an airport, and the like).

Generally, all existing transponder electronic readers of such radio frequency identification systems utilize proprietary systems. That is, a card from one system will not be readable by a system provided by another vendor. In some systems, the transponder object emits a signal modulated by frequency shift keying (FSK), i.e., the binary transmission is represented by a mark and a space which correspond to the 1 and 0 of the binary signal, the mark and space being signals on two separate frequencies (e.g., ⅛ and ¹/₁₀ of the frequency of the RF interrogation signal). Other systems utilize phase shift keying (PSK) as well known in the art. Systems using PSK modulation cannot read the cards which transmit FSK modulated information and systems which read FSK modulated information cannot read the cards which transmit PSK modulated information.

While all such transponder electronic readers read matching transponder objects, in most systems they are also required to communicate with a controller of some sort. The controller generally comprises a central processing unit (CPU) which may interact with a number of such readers which are simultaneously connected to it. A number of different systems have evolved over the years for communicating data from a reader to a controller. Some of these systems, or communications protocols, are known as magnetic stripe communications protocol, Wiegand communications protocol, single wire Wiegand communications protocol, RS232 communications protocol, RS422 communications protocol, and the like. These various communication protocols generally require 1, 2, 3 or more electrical wire connections between the transponder electronic reader and the controller. Furthermore, the data modulation schemes for these various systems differ as well known to those of ordinary skill in the art. This has led to a problem in the industry in the stocking of transponder electronic readers. In order to stock transponder electronic readers which are compatible with the various communications protocols employed by the various controllers, one needs to stock many transponder electronic readers which are mutually incompatible with one another. A need, therefore, exists for an transponder electronic reader which is capable of working with a number of different communication protocols in communicating with a corresponding controller so as to reduce the inventory requirements for transponder electronic readers.

It is also desirable to have the transponder electronic reader require as little field programming as possible. In this way, relatively unskilled personnel may successfully install transponder electronic readers and have them operate with corresponding controllers and transponders with relatively little difficulty. To avoid the necessity to physically program such readers to communicate using a given communications protocol (as by setting DIP switches or jumpers) would be highly desirable.

In certain security and access control situations it would be desirable to do more with the transponder than merely sense the presence of the transponder. Similarly, in any kind of access control system, it would be desirable to provide a user of the access control system with the ability to communicate special signals via a reader without requiring an extensive user interface on the reader which might be subject to vandalism or misuse.

OBJECTS AND ADVANTAGES OF THE INVENTION

Accordingly, it is an object and advantage of the present invention to provide an improved RF identification system.

It is a further object and advantage of the present invention to provide an improved transponder electronic reader for use in an RF identification systems.

It is a further an object and advantage of the present invention to provide a capability to program the transponder reader to communicate with an attached controller using a communications protocol specified by information contained in an output format identification portion of the identification signal stored in the transponder and transmitted to the transponder reader.

It is a further object and advantage of the present invention to provide an improved transponder for use in an RF identification system.

It is a further object and advantage of the present invention to provide a transponder for use in an RF identification system which contains an identification signal which has within it, in addition to an authorization code number, an output format identification portion which, when transmitted to and received by the transponder reader, defines the communications protocol to be used by the transponder reader in communicating with attached devices such as a controller.

Yet another object and advantage of the present invention is the provision of a transponder reader capable of reading both PSK and FSK signals.

Yet another object and advantage of the present invention is the provision of a mechanism by which either the PSK or the FSK mode of operation may be normally disabled and easily authorized in an accountable manner.

It is a further object and advantage of the present invention to provide an improved electronic reader having a detector, a timer and, optionally, a counter capable of producing signals in response to:
a) the detection of the object within the field of inspection of the reader,
b) presence of the object within the field of inspection for a fixed period of time exceeding a minimum threshold.
c) the presentation of the object to the field of inspection a given number of times within a minimum threshold period of time.

These and many other objects and advantages of the present invention will become apparent to those of ordinary skill in the art from a consideration of the drawings and ensuing description of the invention.

SUMMARY OF THE INVENTION

An object identification system and method detects the presence of a target object in a field of inspection and in one aspect of the invention, generates a first signal if the object is left in the field of inspection for more than a minimum threshold period of time. In a second aspect a second signal is generated if the object is introduced to the field of inspection more than a minimum threshold number of times (having been withdrawn from the field of inspection in the interim) within a minimum threshold period of time.

DESCRIPTION OF THE PREFERRED EMBODIMENTS

Those of ordinary skill in the art will realize that the following description of the present invention is illustrative only and is not intended to be in any way limiting. Other embodiments of the invention will readily suggest themselves to such skilled persons from an examination of the within disclosure.

Figure 1:
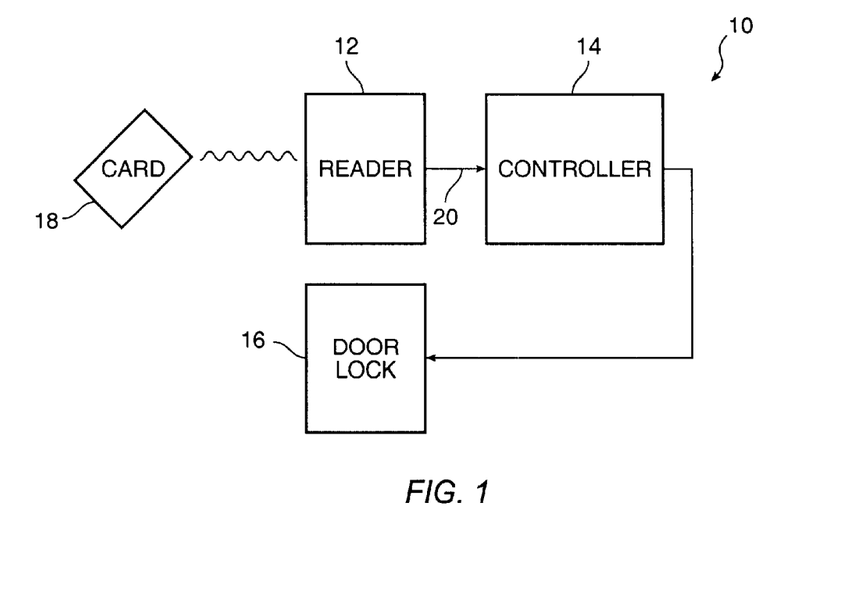
FIG. 1 is a system block diagram of an RF identification system in accordance with a presently preferred embodiment of the present invention.

The present invention is directed to a radio frequency (RF) identification system which solves many problems of the prior art. Turning now to FIG. 1, a system diagram of a radio frequency identification system generally denoted 10 in accordance with a presently preferred embodiment of the present invention is shown. System 10 includes a transponder reader 12, a controller 14, and something controlled by the controller such as a door lock 16, and a transponder 18. As with all such radio frequency identification systems, transponder reader 12 preferably continuously emits a radio frequency interrogation signal of a given frequency. According to presently preferred embodiments of the present invention, the interrogation signal is either at approximately 125 KHz or at approximately 13.56 MHz although those of ordinary skill in the art will realize that virtually any other frequency in the RF spectrum could be used. The radio frequency signal is received by transponder 18 which includes an antenna and a rectifier circuit or "power circuit" for deriving electrical power from the received signal. Transponder 18 then transmits, in response to receipt of the interrogation signal from transponder reader 12, a transponder signal of a lower frequency than the interrogation signal having modulated thereon a stored identification signal in the form of a binary data stream. As long as the transponder 18 is close enough to transponder reader 12 that it can receive the interrogation signal therefrom, it will also continuously transmit a transponder signal which can then be picked up by the transponder reader 12 and demodulated.

Upon demodulating the transponder signal, transponder reader 12 obtains therefrom the identification signal originally stored on card 18. A portion of the identification signal is an authorization code number. That authorization code number is passed from transponder reader 12 to controller 14 over data communication line 20 in accordance with a given data communications protocol. In accordance with a presently preferred embodiment of the present invention, the data communications protocol used over line 20 is specified by an output format identification portion of the identification signal transmitted from transponder 18 to transponder reader 12. The protocol may be preferably one of several well known in the art such as, for example, RS232, RS422, various versions of the Wiegand protocol, and various versions of the mag-stripe protocol. Other protocols may also be specified and used where appropriate.

The ability to store the selected data communications protocol to be used by a transponder reader 12 reading the transponder at the time of initially programming the transponder 18 permits a single transponder reader 12 to be used with a variety of controllers 14 and avoids the necessity for stocking a number of different transponder readers each compatible with a particular controller system.

Upon receipt of a valid authorization code number over line 20, controller 14 then activates door lock 16 or other appropriate apparatus as well known to those of ordinary skill in the art.

Figure 2:
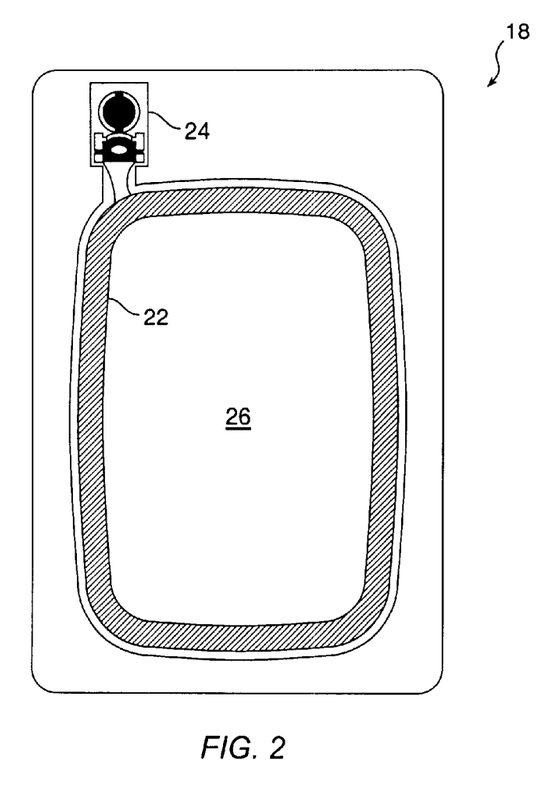
FIG. 2 is a sectional top plan view of an object in accordance with a presently preferred embodiment of the present invention.

Turning now to FIG. 2, a top view of a typical transponder 18 is shown. Transponder 18 comprises an antenna 22 connected to a transponder integrated circuit 24 all preferably embedded within a plastic card or tag 26 or otherwise encapsulated. According to a presently preferred embodiment of the present invention, the integrated circuit is a Micro Chip Technology MCRF250 or MCRF350. The MCRF250 operates at 125 KHz and the MCRF350 operates at 13.56 MHz. Those of ordinary skill in the art will realize that this particular integrated circuit can be substituted for individual components or other integrated circuits made by other manufacturers in order to achieve the same purpose and function. Micro Chip Technology, Inc. is located in Chandler, Ariz.

Figure 3:
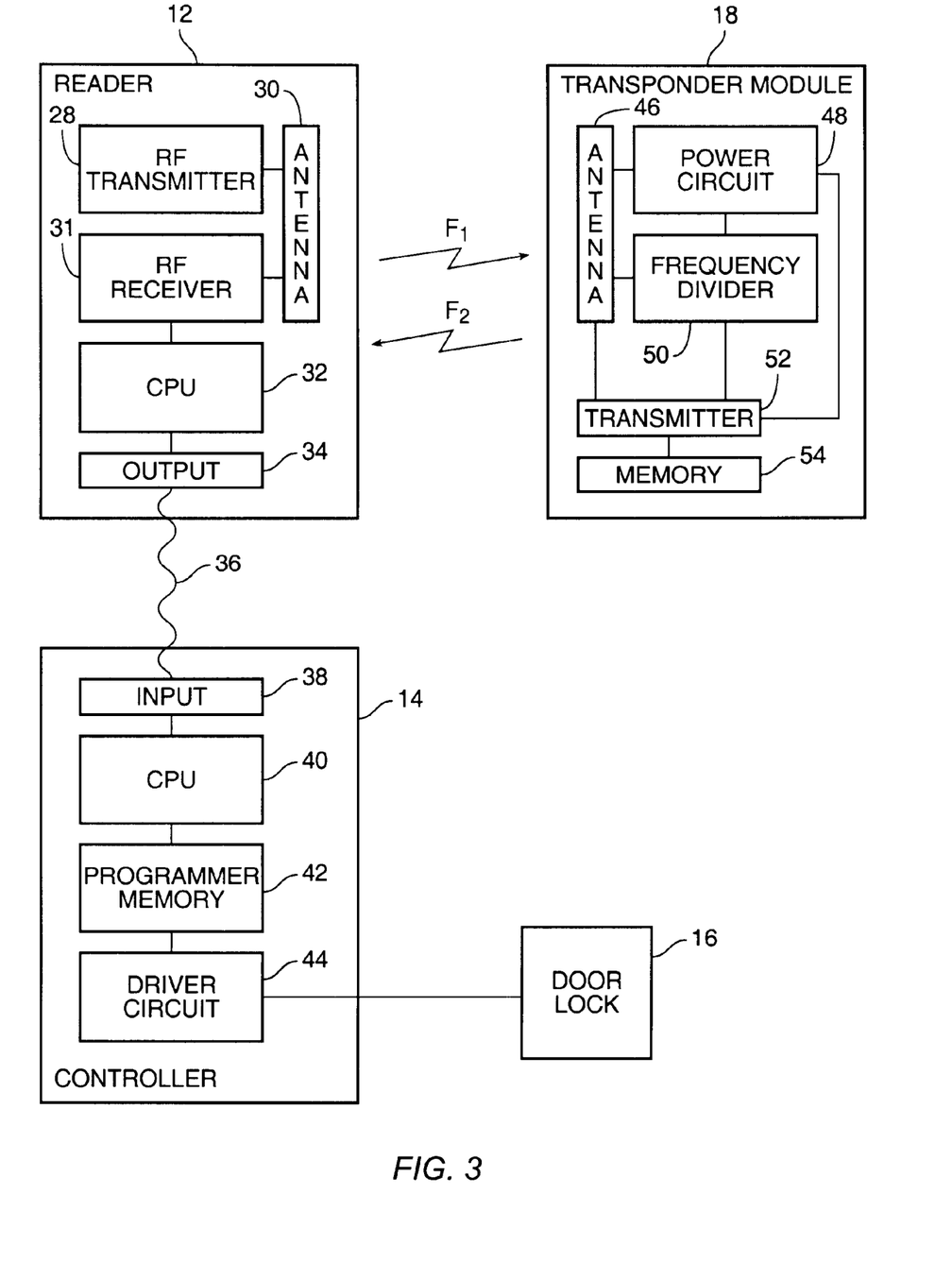
FIG. 3 is a detailed system block diagram of an RF identification system in accordance with a presently preferred embodiment of the present invention.

Turning now to FIG. 3, a detailed block diagram of a system in accordance with the present invention is shown. Reader or transponder reader 12 includes an RF transmitter section 28 which generates an RF carrier signal which is coupled to antenna 30 for transmission from reader transponder 12. Also coupled to antenna 30 is an RF receiver section for receiving and demodulating signals received from the transponder 18 over antenna 30. Coupled to the RF receiver section 31 is a CPU 32 which processes and demodulates the identification signal received from the transponder 18 and sets the communications protocol to be used in communicating between transponder reader 12 and controller 14 in accordance with an output format identification portion of the identification signal received from the transponder module 18. CPU 32 is coupled to conventional output drivers 34 and a data link 36 communicating with controller 14.

Controller 14 includes typical input circuitry 38 coupled to a conventional CPU 40 which is in turn coupled to programmable memory 42 for storing access criteria to be compared with the authorization code number received from the transponder reader 12. CPU 40 is also coupled to driver circuitry 44 of a conventional nature for driving a door lock or other associated apparatus 16 upon determination by CPU 40 that access is permitted. Those of ordinary skill in the art will also realize that this system can easily be adapted to systems for inventory control and object identification and tracking, e.g., by recording the presence of a serial number received from a transponder module rather than by opening a door lock.

Transponder 18 comprises an antenna 46 coupled to a power circuit 48 which rectifies a received interrogation signal from transponder reader 12 to power the circuitry of transponder 18. Also coupled to antenna 46 is a frequency divider circuit 50 for providing a carrier signal to transmitter 52 (also coupled to antenna 46). Frequency divider 50 provides a signal used by transmitter 52 to modulate an identification signal onto. The identification signal is preferably stored as a binary 128 bit value in memory 54. Those of ordinary skill in the art will realize that other numbers of bits could be used as could non-binary values. Memory 54 is preferably a one time programmable memory cell, such as an EEPROM. Upon activation by the presence of an interrogation signal, transmitter 52 transmits an identification signal modulated onto a carrier at an integer fraction of the interrogation signal. For a 125 KHz system (i.e., one operating with an interrogation signal of 125 KHz), the transponder signal in PSK mode is at approximately 62.5 KHz and in FSK mode is at 12.5 KHz and 15.625 KHz for the mark and space (the one that is the mark and the one that is the space are a matter of choice for the developer).

Figure 4:
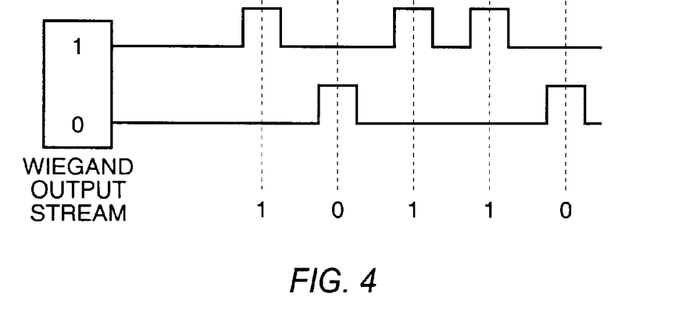
FIG. 4 is a timing and data output diagram for a conventional Wiegand output data stream.

Turning now to FIG. 4, the output of a Wiegand output stream is depicted. In the Wiegand output protocol there are two active lines, one associated with the binary value 1 and the other associated with the binary value 0. To indicate the presence of a 1, the 1 line goes high and the 0 line stays low. To indicate the value of 0, the 0 line goes high and the 1 line stays low. FIG. 4 indicates the manner in which the binary value 10110 would be transmitted over this pair of lines.

Figure 5:
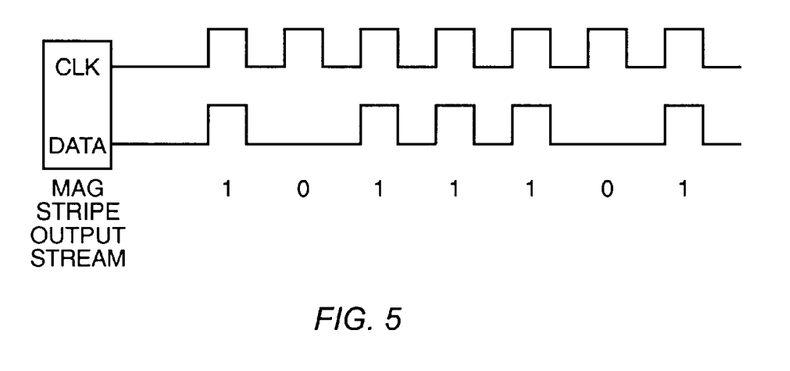
FIG. 5 is a timing and data output diagram for a conventional magnetic stripe output data stream.

FIG. 5 shows data transmission in accordance with the conventional magnetic stripe output protocol. In the magnetic stripe protocol, there are two lines for conveying data, one is a clock line (CLK) and one is a data line (DATA). The clock line generates a pulse at a regular time interval. The data line generates a pulse corresponding with a clock pulse to represent a 1 and the lack of a pulse corresponding with a clock pulse indicates a 0. The signals shown in FIG. 5 indicate how the binary value 1011101 would be transmitted over this pair of lines in a conventional magnetic stripe output protocol.

Those of ordinary skill in the art will realize that there are a number of different ways to transmit such data including RS422, RS232, various versions of the magnetic stripe output stream format including open collector versions thereof and various versions of the Wiegand output stream format including open collector versions thereof and single wire versions thereof. The advantage of this aspect of the present invention is that the transponder reader 12 can be simply programmed by the transponder to output data to the controller 14 in any one of a number of different data communications protocols by simply setting the output format identification portion of the identification signal stored on the transponder 18 to the correct value corresponding to that particular communications protocol.

In practice, an installer would purchase a transponder reader 12 in accordance with the present invention and connect it to an existing controller 14 having a given data communications protocol. The transponder 18 would then all be programmed in accordance with the controllers's requirements. A data communications protocol would be specified in the output format identification portion of the identification signal stored on the transponder 18 (this value is not passed to the controller 14). Where the card is read, the reader automatically passes only the authorization code number to the controller 14 in accordance with the specified protocol.

Figure 6:
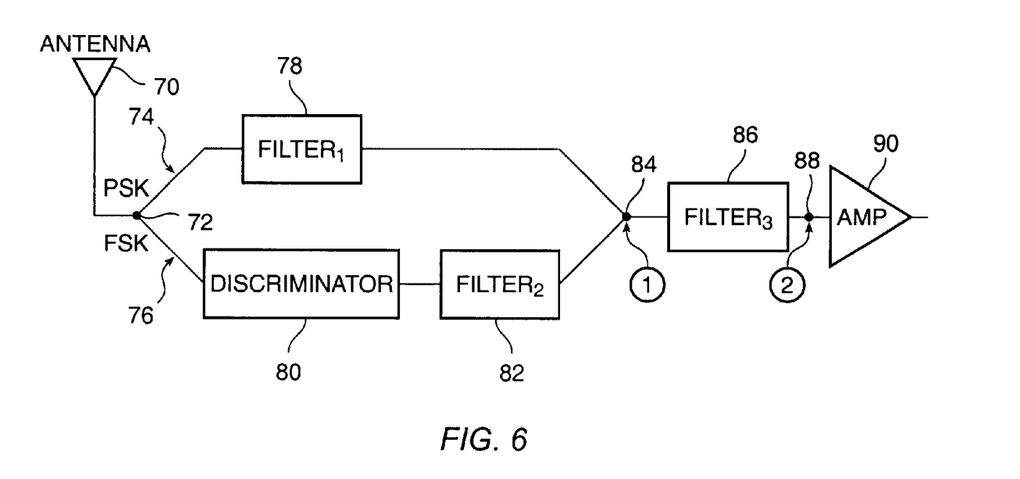
FIG. 6 is a block diagram of a circuit for receiving transponder signals modulated with either PSK or FSK modulation techniques in accordance with a presently preferred embodiment of the present invention.

Turning now to FIG. 6, an additional aspect of the invention is disclosed. Because most transponders used in RF identification systems use either phase shift keying (PSK) or frequency shift keying (FSK), it has usually been the case that transponders and transponder readers had to comport with one standard or the other standard, i.e., PSK or FSK. No prior known systems are capable of dual mode operation. In accordance with the present invention, however, the front end of the reader comprises two distinct signal processing paths. The first path processes PSK signals and the second path processes FSK signals. Generally, PSK signals are at a carrier frequency of one-half (or another integer fraction) of the interrogation signal frequency. That means, for an interrogation signal frequency of 125 KHz, the transponders's response PSK signal would be at 62.5 KHz. FSK signals, on the other hand, commonly have a mark signal and a space signal, one of the mark and space signals being at one-eighth the interrogation signal frequency and the other being at one-tenth the interrogation signal frequency. Other frequency shifts may be used. Thus, an FSK signal might have a mark at 12.5 KHz, and a space at 15.625 KHz, or vice versa. It is therefore possible, with filters, to direct the two signal trains through different branches of a circuit for processing.

Turning now to FIG. 6, an antenna 70 associated with the transponder reader 12 receives a signal from transponder 18 and passes it to circuit node 72. At circuit node 72, the signal will pass along branch 74 if it is a PSK signal, i.e., it has a first frequency less than the frequency of the interrogation signal. Similarly, the signal will pass along branch 76 for FSK processing if it has a frequency less than that of a PSK signal. In this example, assuming that the interrogation signal is a 125 KHz signal, 62.5 KHz signals will pass along the PSK branch 74 and 12–15 KHz signals will pass along the FSK branch 76. This is made possible by the use of filters. Filter No. 1 (78) is designed to pass frequencies consistent with the PSK signal pass band. In this example, those frequencies would be near 62.5 KHz. Filter 78 is designed to reject frequencies at 125 KHz as well as to reject frequencies significantly below 62.5 KHz, such as a FSK signals at 12–16 KHz. Turning to the FSK processing branch 76, discriminator 80 is used in a conventional manner to discriminate or AM envelope detect the mark and space FSK signals at 12–16 KHz. Filter No. 2 (82) is designed to stop 125 KHz signals but to pass those signals in the range of 12–16 KHz. The PSK and FSK branches 74 and 76 rejoin at node 1 (84) and are then passed through filter no. 3 (86) which also rejects 125 KHz signals whereupon they reach node 2 (88) and are input to an operational amplifier or other amplifier circuit 90 for amplification prior to being processed in a conventional way by the remainder of the circuitry of the system.

Figure 7:
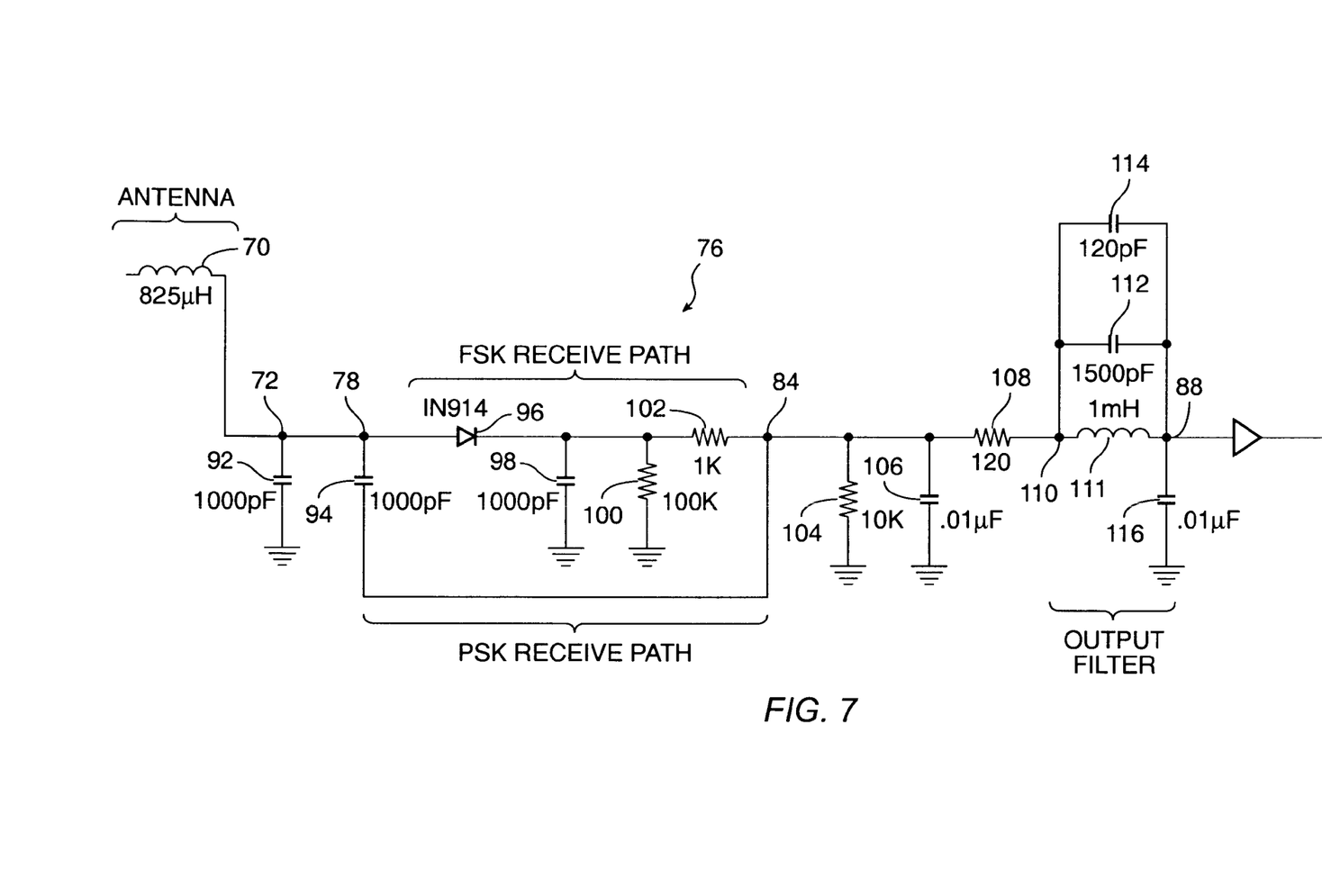
FIG. 7 is a detailed circuit diagram for circuit for receiving transponder signals modulated with either PSK or FSK modulation techniques in accordance with a presently preferred embodiment of the present invention.

The block diagram of FIG. 6 is illustrated in more detail in FIG. 7 with a detailed schematic diagram. In accordance with a presently preferred embodiment operated at 125 KHz, antenna 70 comprises an 825 uH inductor which is coupled to circuit node 72. Filter 1 (78) from FIG. 6 comprises 1000 pF capacitor 92 disposed between node 72 and ground, and 1000 pF capacitor 94 disposed between node 72 and node 84.

In the FSK receive path 76, discriminator 80 comprises diode 94 which is preferably of the type 1N914 but may be any appropriate transistor or diode or other device capable of detecting the AM envelope of the FSK signal. Filter 2 (82) comprises 1000 pF capacitor 98 disposed between the cathode of diode 96 and ground along with resistor 100 which is preferably a 100 kilohm resistor disposed between the cathode of diode 96 and ground and resistor 102 which is preferably a 1000 ohm resistor disposed between the cathode of diode 96 and node 84, filter 3 (86) comprises resistor 104 which is preferably a 10 kiloohm resistor disposed between node 84 and ground, capacitor 106 which is preferably a 0.01 $\mu$F capacitor disposed between node 84 and ground, a resistor 108 which is preferably a 120 ohm resistor disposed between node 84 and node 110, inductor 111 which is preferably a 1 mH inductor disposed between node 110 and node 88 in parallel with, capacitor 112 and capacitor 114 which are preferably, respectively, 1500 pF and 120 pF capacitors, and finally, capacitor 116 which is preferably a 0.01 $\mu$F capacitor disposed between node 88 and ground.

Figure 10:
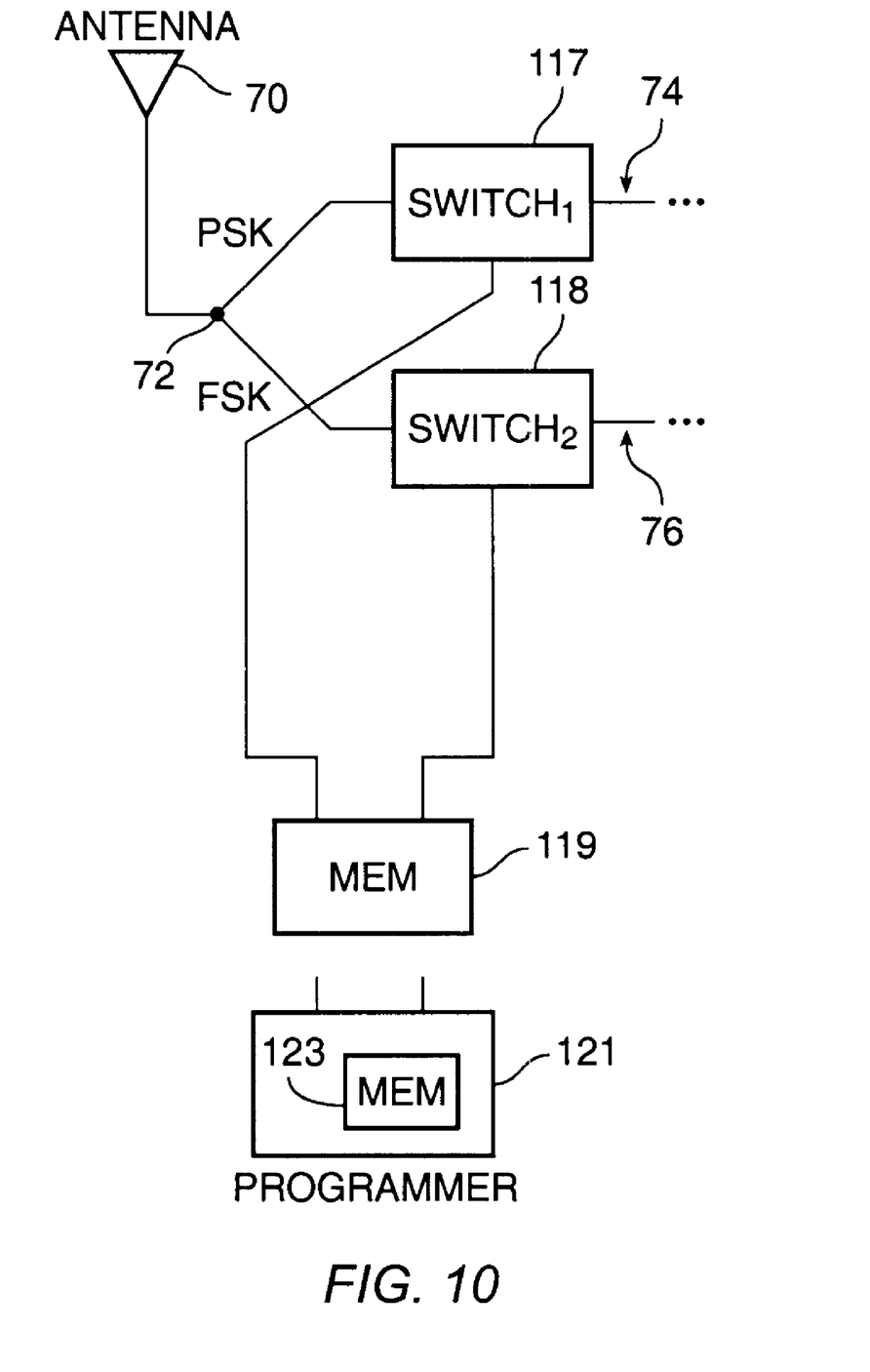
FIG. 10 is a partial block diagram of a modification of the circuit of FIG. 6 in which programmable switches control the flow of RF signal through the PSK and FSK signal processing branches of the electronic reader in accordance with a presently preferred embodiment of the present invention.

In accordance with a presently preferred embodiment of the present invention shown in FIG. 10, a switch 117, 118 (such as a transistor, relay or like device) may be incorporated into either or both of PSK branch 74 and FSK branch 76. The switch 117, 118 may be operated by a microprocessor, memory cell 119, or other convenient means well known to those of ordinary skill in the art. The switch may be utilized to enable/disable one or both branches. In this way, for marketing purposes or for other purposes such as security purposes, one branch may be left disabled and the customer could be charged an additional fee for use of an enabler 121 to unlock the remaining signal path, or switch to the other signal path. An enabler 121 could take many forms. Presently preferred is an EEPROM based device which would temporarily mate with a connector on transponder reader 12 to enable FSK operation (for example) and simultaneously decrement a counter in a memory 123 on board the enabler. Once the enablers's counter reached zero, it could not be used again without being reset by the vendor. In this way a premium could be charged for dual mode use and the premium charge could be associated with the sale of or use of the enabler.

Figure 8:
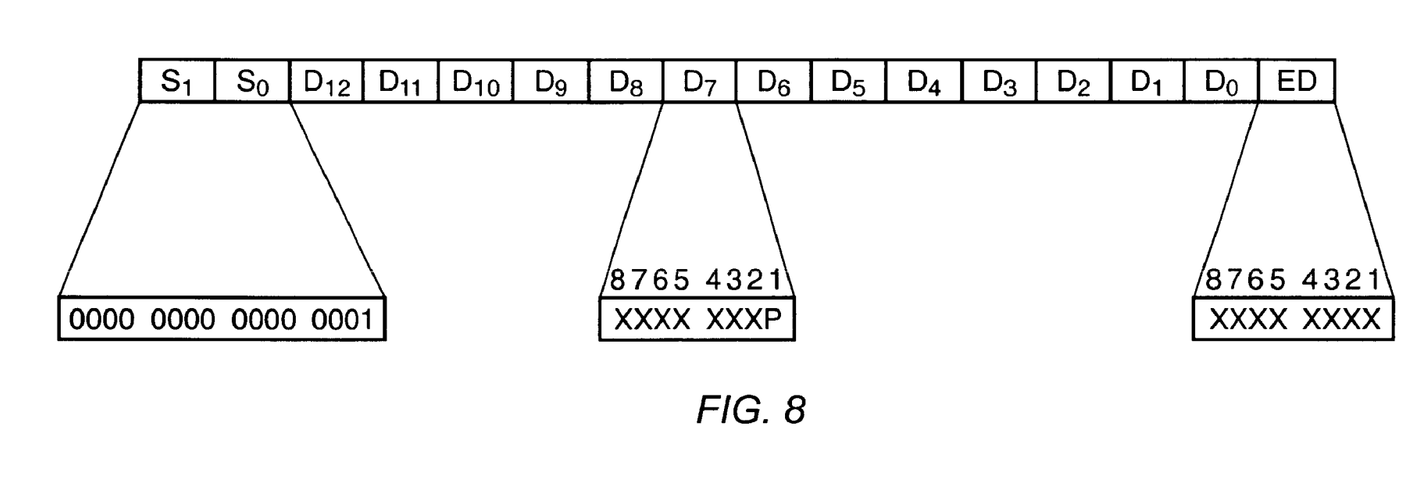
FIG. 8 is a diagram showing the layout of data stored on an object in accordance with a presently preferred embodiment of the present invention.

Turning now to FIG. 8, there is shown a diagram illustrating the organization of the identification signal stored on transponder 18 as a binary value and transmitted in response to receipt of an interrogation signal by the transponder reader 12. As can be seen, the identification signal is broken into 16 eight bit groups or bytes for a total of 128 bits. Those of ordinary skill in the art will realize that other configurations could be used and that this description applies only to a presently preferred embodiment of the present invention. In accordance with the presently preferred embodiment of the present invention, the bytes are denoted from left to right as follows: S1, S0, D12, D11, D10, D9, D8, D7, D6, D5, D4, D3, D2, D1, D0, and ED. Bytes S1 and S0 represent the synchronization portion of the identification signal. These are set to the binary value 0000 0000 and 0000 0001 which corresponds to a 0 having even parity and a 0 having odd parity. The data fields D12 through D0 are each configured as seven bits of data followed by a parity bit. Those of ordinary skill in the art will realize that the parity bit could be any of the eight bits. Byte ED is an error detection byte in which is stored an eight bit CRC value calculated over bytes D0 through D12. Such CRC or cyclic redundancy check system are well known to those of ordinary skill in the art. In a presently preferred embodiment of the present invention a 64 bit authorization code number is stored in the identification signal as follows: bit 63 is stored as the first data bit (seventh bit from left) of block D9, bits 62–56 are stored as bits 1–7 of block D8, bits 55–49 are stored as bits 1–7 of block D7, bits 48–42 are stored as bits 1–7 of block D6, bits 41–35 are stored as bits 1–7 of block D5, bits 34–28 are stored as bits 1–7 of block D4, bits 27–21 are stored as bits 1–7 of block D3, bits 20–14 are stored as bits 1–7 of block D2, bits 13–7 are stored as bits 1–7 of block D1 and bits 6–0 are stored as bits 1–7 of block D0. Additional bits in blocks D12, D11, D10 and D9 may be used for various functions including the provision of an output format identification portion of the signal.

In order to provide a variable bit length output from the transponder reader 12 to the controller 14, a single start bit is encoded in the access I.D. portion of the data field (i.e.) D9:1 through D0:1. The start bit immediately follows any necessary leading zeroes and immediately precedes the most significant bit of the authorization code number. It therefore indicates by its position in the field, the number of output bits required.

An example of how the authorization code number is stored in the identification signal follows. Assume that one desires to store authorization code number 8481041 (decimal). This is 816911 in hexadecimal and 1000 0001 0110 1001 0001 0001 in binary. A total of 24 bits are required to store this value. This number must be encoded, however, as a 26-bit number when the two parity bits are appended. Thus the number to encode becomes 01 0000 0010 1101 0010 0010 0011 using the published Security Industry Association 26-Bit Wiegand Reader Interface Standard. Then 26 bits will now occupy bit portions 0 through 25 of the data portion of the identification signal. A Start Bit will be placed at bit position 26 (indicating 26-bit format). The bit pattern (not including data byte parity bits) is thus: 1010 0000 0101 1010 0100 0100 011 with the addition of the Start Bit. Distributing these bits into the 7-data bit/1-parity bit per byte format results in the following:

D5: 0000 0001
D4: 0000 0001
D3: 0101 0001
D2: 0001 0110
D1: 0100 1001
D0: 0100 0110

Figure 9:
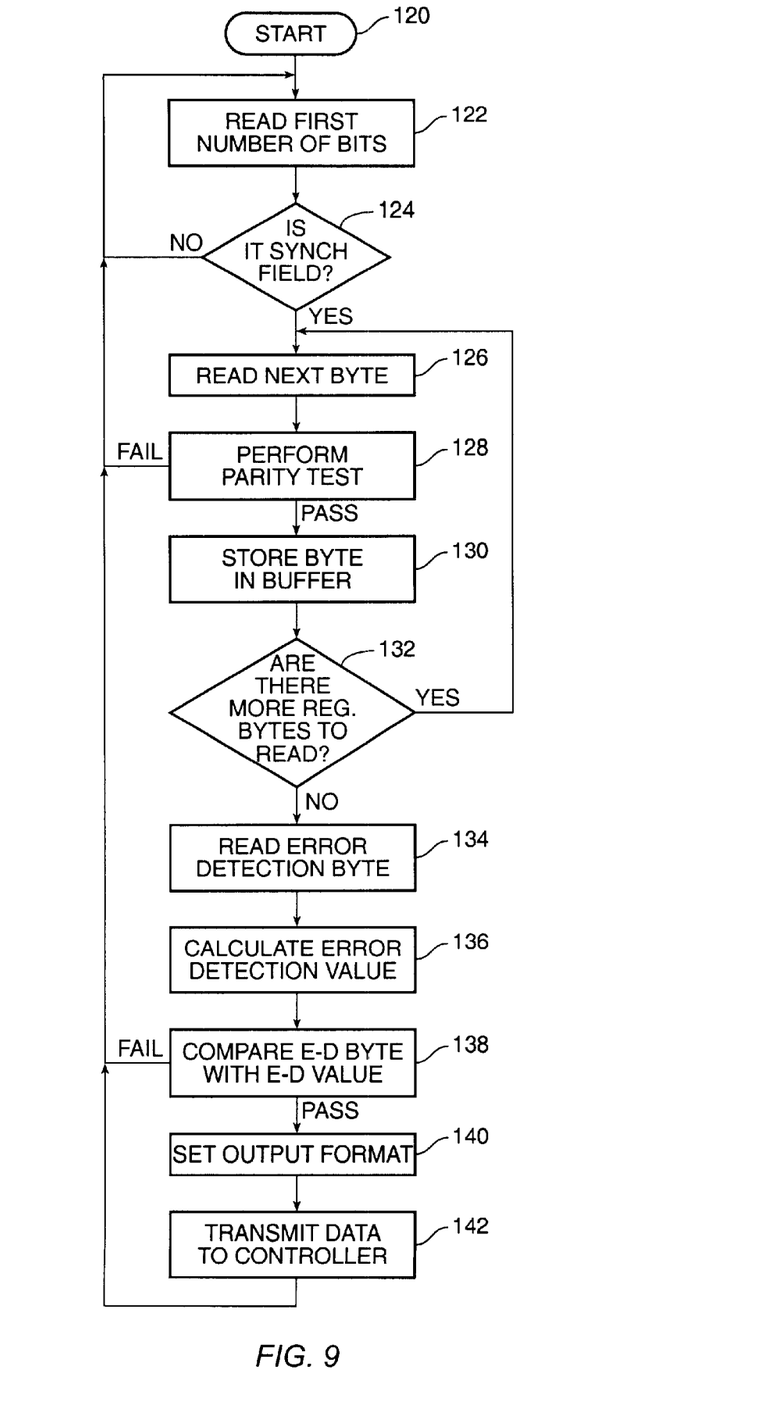
FIG. 9 is a flow chart depicting a method for reading and verifying data received from an object in accordance with a presently preferred embodiment of the present invention.

A method of reading the identification signal and simultaneously verifying its validity is depicted in FIG. 9. In accordance with the method of FIG. 9, the process starts at block 120. At block 122 the first number of bits is read. In accordance with the presently preferred embodiment of the present invention, this would include a 16 bit group of bits corresponding to the length of the synchronization field S0, S1. The bit pattern obtained in block 122 is then compared with the pre-determined synchronization field to determine if, in fact, it is the synchronization field at block 124. The synchronization bit pattern S0, S1 defined above is selected because it cannot be duplicated in any of the valid data fields or in the error detection field. This is so because of the parity requirement for the data fields D0 through D12. If the bit pattern obtained in block 122 is not the synchronization field, control is transferred back to block 122 where the next bit pattern shifted over one bit from the identification signal is read again. If the synchronization field is detected, control transfers to block 126. At block 126 the next eight bit byte of data is read. At block 128 a parity test is conducted because that byte must be one of the data bytes. If the parity test has failed, control transfers back to block 122. If the parity test is passed, control transfers to block 130 whereupon the byte is a valid byte and is stored in a buffer for later use. At block 132, if additional bytes in the data field remain to be read, control is transferred back to block 126 in order to read those additional bytes. If no additional data bytes remain to be read, then control transfers to block 134 where the error detection byte, the final byte in the identification signal, is read. At block 136, the error detection value is calculated for the bytes that have been stored. This value is then compared at block 138 with the error detection value that was read. If the two values are not the same, then there is an error and control transfers back to block 122 for additional processing. If no error is detected, then control passes to block 140 whereupon the output format determined from the identification signal output format identification portion is set in the transponder reader 12 for establishing an appropriate protocol for communication with the controller 151. Data is then transmitted from the electronic reader 12 to the controller 151 in block 142 and the process starts anew with control transfer back to block 122.

According to the presently preferred embodiment of the present invention, the error detection system utilizes a conventional CRC polynomial type error detection system. These systems are well known to those of ordinary skill in the art and need not be further described herein.

Figure 11:
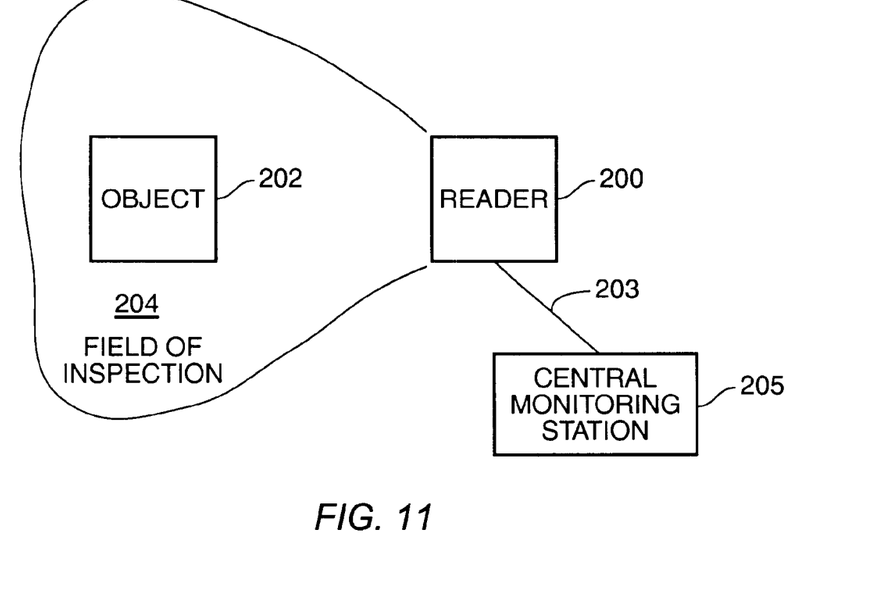
FIG. 11 is a block diagram showing the reader and its corresponding field of inspection with an object located therein.

In accordance with another presently preferred embodiment of the present invention, an additional dimension of communication can be obtained by the manner in which an object is presented to a reader. Turning now to FIG. 11, a reader 200 and its corresponding field of inspection 204 are shown. An object 202 is disposed within the field of inspection 204 of reader 200. In accordance with this embodiment of the present invention, a suitably adapted reader can detect the presence of object 202 within field of inspection 204, either modulated in some fashion as by multiple presentations of a transponder card or the presence of an object placed within the field of inspection for a lengthy period of time exceeding a predetermined threshold.

This presently preferred embodiment of the present invention can be utilized in a number of different object reader systems, including but not limited to, the previously described transponder system, as well as passive systems such as retinal readers, fingerprint readers, bio-metering (such as palm readers and camera based systems and the like) and other systems where some object is presented to a defined field of inspection in the normal course. An "alert" or other type of signal can then be passed to a central monitoring station 205 or computer for further action such as dispatch of a security guard, enabling additional features, or the like.

Figure 12:
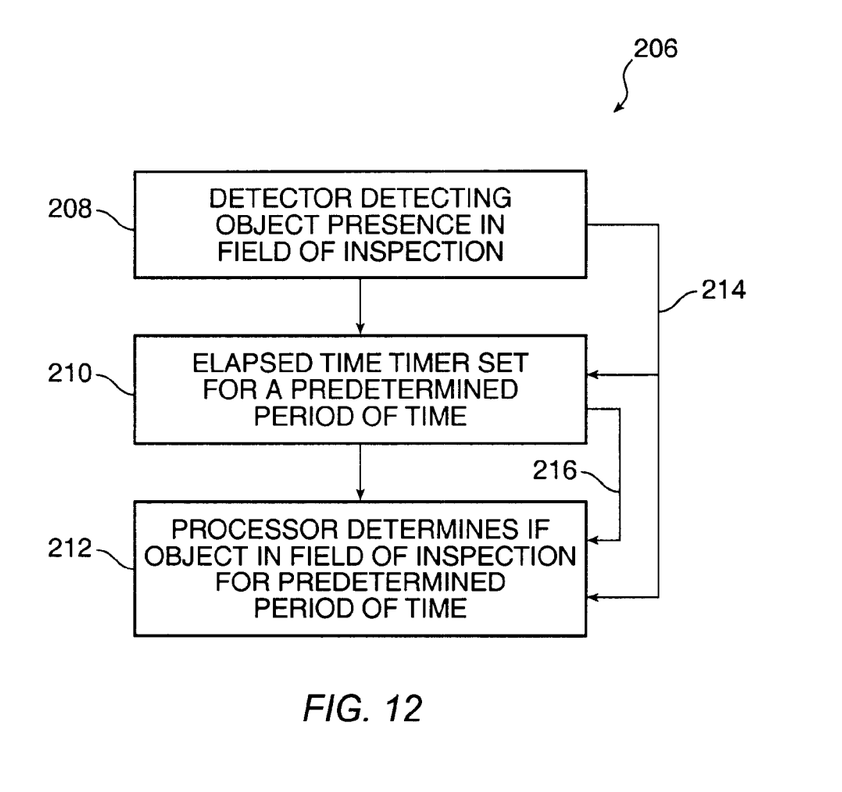
FIG. 12 is a system block diagram of the detector timer and processor of a first presently preferred embodiment of the present invention.

Turning now to FIG. 12, a system block diagram of a first presently preferred embodiment of the present invention is shown. System 206 includes a detector 208 which acts to detect the presence of an object in the field of inspection. Once the detector detects the object, it indicates that detection as a signal on line 214. Timer 210 is an elapsed timer of either the count-up or count-down variety which is set to expire after a predetermined period of time specifying the window of sensitivity of system 206. Timer 210 is triggered by a signal from detector 208 on line 214 so that upon first detection of the object in the field of inspection timer 210 begins its count-down (or count-up). While timer 210 is counting, processor 212,which may be any suitable form of logic as well known to those of ordinary skill in the art, determines whether an object detected by detector 208 has been in the field of inspection for the duration of timer 210. If the object is in the field of inspection for the minimum time specified by timer 210, then the processor generates a signal which may be used, for example, to indicate an alarm condition, to summons security or police agents to the reader, or to activate some other specified feature as programmed into the system including this device. Processor 212 is coupled to timer 210 by line 216.

Figure 13:
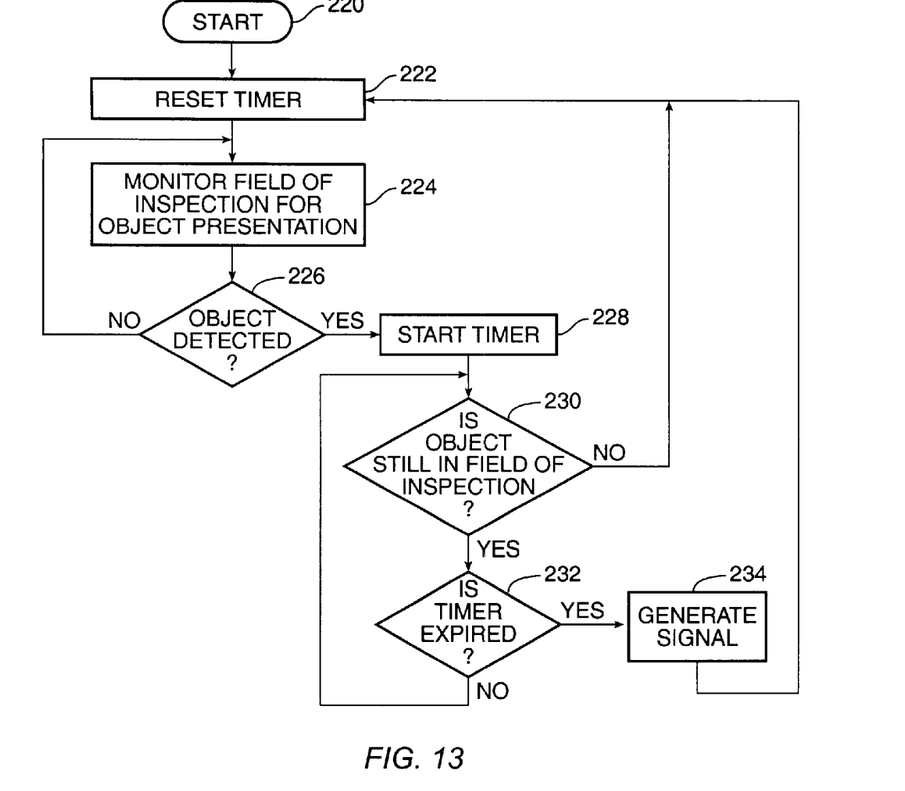
FIG. 13 is a flow diagram showing the method of operation of the system of FIG. 12.

FIG. 13 is a flow diagram showing a preferred method of operation of system 206. The procedure starts at block 220 and the timer is reset at block 222. Control then passes to block 224 where the field of inspection is monitored for the presence or presentation of an object readable by the reader. If an object is detected at block 226 then control passes to block 228 where the timer is started. If no object is detected, then control passes back to block 224 for the continued monitoring of the field of inspection. Once the timer has been started at block 228, control passes to block 230 and if the object is still in the field of inspection, control passes to block 232 where it is determined if the timer has expired. If the timer has not expired, then control passes back to block 230. If the timer has in fact expired that means that the object was in the field of inspection for the duration of the timer and, therefore, it is appropriate to generate the desired signal and control passes to block 234 for the purpose of generating that signal. Once the signal has been generated at block 234, control passes back to block 222 where the timer is reset and the process begins anew. At block 230, if the object is not still in the field of inspection that means that the object was removed from the field of inspection prior to the expiration of the timer as in a normal presentation of the card (or other object) which would not normally generate the signal generated at block 234. Therefore, control passes back to block 222 where the timer is reset and the process begins anew.

Figure 14:
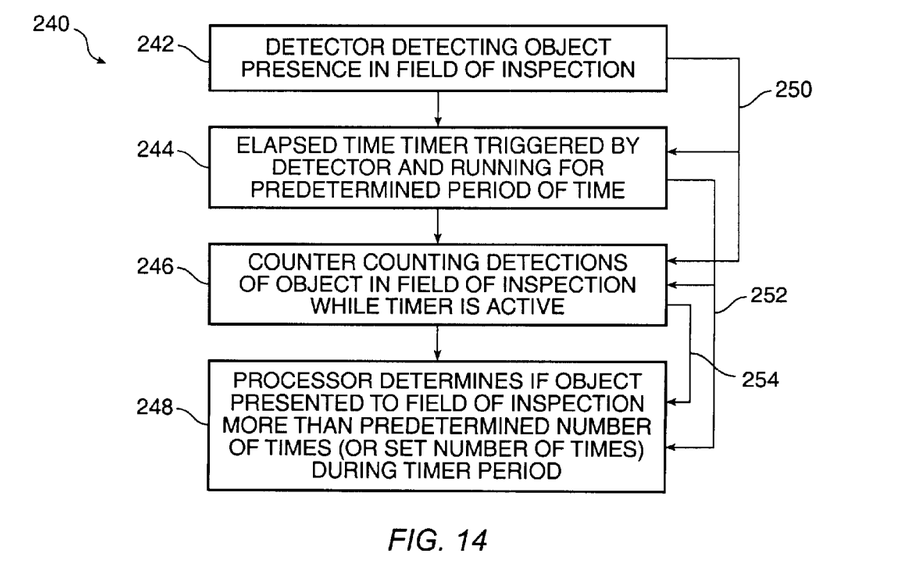
FIG. 14 is a system block diagram showing the detector timer counter and processor of a second presently preferred embodiment of the present invention.

Turning now to FIG. 14, a system 240 in accordance with a second presently preferred embodiment of the present invention includes a detector 242, a timer 244, a counter 246, and a processor 248. Detector 242 detects the presence of an appropriate object in the field of inspection as discussed earlier. Timer 244 is an elapsed time timer of either the count-up or count-down type which is triggered on line 250 by detector 242. The timer runs for a predetermined period of time during which counter 246 counts the number of presentations of the object to the field of inspection. Timer 244 is preferably coupled to counter 246 and to processor 248 over line 252, although other embodiments are possible as would now be apparent to those of ordinary skill in the art at this point. The purpose of counter 246 is to count the number of presentations of the object to the field of inspection while the timer is active. That information is then passed to processor 248 which is also on line 254 which is also in communication with the timer 244 over line 252. Processor 248 determines if the object presented to the field of inspection was presented more than a predetermined number of times (or at least a set number of times) during the timer period. Thus in operation, flashing a card or other object at the field of inspection a number of times can have the desired effect of triggering a special signal which may be used for calling security or police agents to the scene or activating some other desired feature of the broader security or other apparatus to which system 240 is connected.

Figure 15:
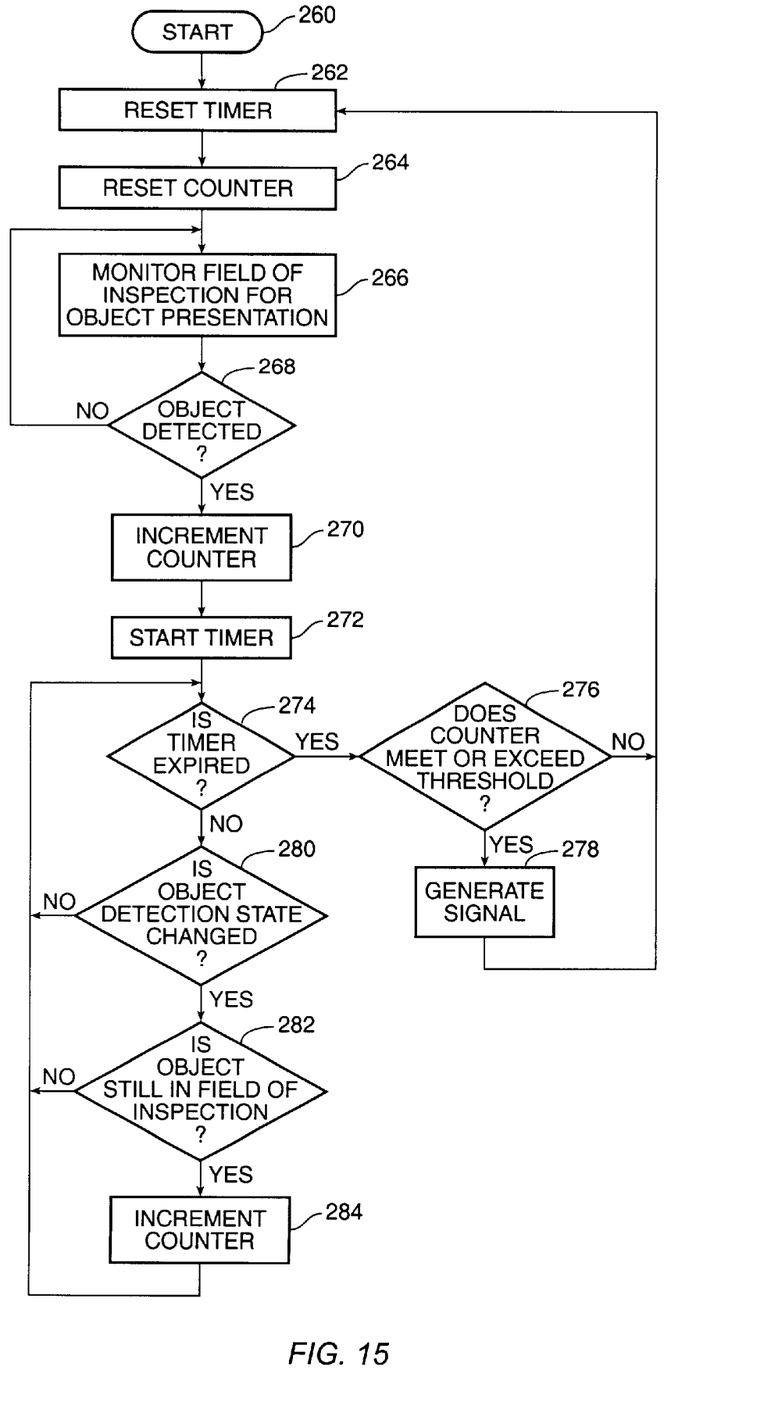
FIG. 15 is a flow diagram showing the method of operation of the system of FIG. 14.

Turning now to FIG. 15, a flow diagram showing the operation of the system 240 shown in FIG. 14 is presented. Operation begins at block 260 and passes to block 262 where the timer is reset. Control then passes to block 264 where the counter is reset. Control then passes to block 266 where the field of inspection is monitored for the presentation of an object as discussed before. Control passes to block 268 and if no object is detected in the field of inspection control continues back to block 266 to continue the monitoring process. Once an object is detected at blocks 266 and 268, control passes to block 270 where a counter is incremented to represent the first detection of an object in the field of inspection as detected at blocks 266 and 268. The timer is started at block 272 and at block 274 the timer is checked for expiration. If the timer has in fact expired, control passes to block 276 where the counter is checked. If the counter exceeds or meets the appropriate threshold as predetermined, that means that the appropriate number of presentations were made within the period defined by the timer and it is appropriate to generate the desired signal which is done at block 278. Once the signal is generated control passes back to block 262 where the timer and counter are reset and the process begins anew. If at block 276 the counter does not exceed or meet the appropriate threshold, again the control passes back to block 262 where the timer and counter are reset and this indicates that the requisite number of presentations were not made within the predetermined time set by the timer. If at block 274 the timer has not expired, control passes to block 280 where a change in the detection state of the object is checked. A change in the detection state of the object simply means that if the object was in fact detected and then it is no longer detected, then the state has changed. Similarly, if the object was not detected while it was out of the field of inspection and it has become detected again, that also indicates a state change. If no state change has occurred, control passes back to block 274 where the timer is again checked. If the state change has occurred, control is passed to block 282 where it is determined whether or not the object is presently in the field of inspection. If the object is not in the field of inspection, that simply means that the state change represented the object being withdrawn from the field of inspection and control passes back to block 274. If the object is in the field of inspection, that means that the object was re-presented to the field of inspection and it is now appropriate to increment the counter one more time. Control is then passed to block 284 to increment the counter and control then passes to block 274 to repeat the process.

While illustrative embodiments and applications of this invention have been shown and described, it would be apparent to those skilled in the art that many more modifications than have been mentioned above are possible without departing from the inventive concepts set forth herein. The invention, therefore, is not to be limited except in the spirit of the appended claims.

What is claimed is:

1. An identification system including a reader for reading an object and providing a first output signal if said object has certain predetermined characteristics readable by said reader, said system comprising:

a detector detecting the presence of the object in a field of inspection of said detector;

a timer responsive to said detector and started by the detection of the object in said field of inspection; and a processor responsive to said detector and said timer, said processor generating a second output signal if the object is disposed within said field of inspection at least a predetermined period of time, wherein said detector includes an antenna, a PSK receive path disposed between said antenna and a first circuit node, an FSK receive path disposed between said antenna and said first circuit node, and a first filter for attenuating a first RF frequency disposed between said first circuit node and a second circuit node, said PSK receive path includes a second filter for attenuating said first RF frequency and passing frequencies approximately one-half of said first RF frequency, and said FSK receive path includes a discriminator and a third filter, said third filter for attenuating frequencies approximately one-half of said first RF frequency and above and passing RF frequencies less than one-fourth of said first RF frequency.

2. An identification system according to claim 1, wherein the reader and object comprise an RFID system.

3. An identification system according to claim 1, wherein said second output signal is generated if the object is held in said field of inspection in excess of two seconds.

4. An identification system according to claim 1, wherein said second output signal is utilized to send an alert signal to a central monitoring system.

5. An identification system including a reader for reading an object and providing a first output signal if said object has certain predetermined characteristics readable by said reader, said system comprising:

a detector detecting the presence of the object in a field of inspection of said detector;

a timer responsive to said detector and started by the detection of the object in said field of inspection;

a counter counting the number of times the object is presented to the field of inspection while said timer is active; and a processor responsive to said timer and said counter, said processor generating a second output signal if the object is disposed within said field of inspection at least a first number of times while said timer is active, wherein said detector includes an antenna, a PSK receive path disposed between said antenna and a first circuit node, an FSK receive path disposed between said antenna and said first circuit node, and a first filter for attenuating a first RF frequency disposed between said first circuit node and a second circuit node, said PSK receive path includes a second filter for attenuating said first RF frequency and passing frequencies approximately one-half of said first RF frequency, and said FSK receive path includes a discriminator and a third filter, said third filter for attenuating frequencies approximately one-half of said first RF frequency and above and passing RF frequencies less than one-fourth of said first RF frequency.

6. An identification system according to claim 5, wherein the reader and object comprise an RFID system.

7. An identification system according to claim 5, wherein said second output signal is generated if the object is held in said field of inspection in excess of two seconds.

8. An identification system according to claim 5, wherein said second output signal is utilized to send an alert signal to a central monitoring system.

9. A method for responding to the presentation of an object to a reader in an identification system, the object having certain predetermined characteristics readable by said reader, said method comprising:

detecting the presence of the object in a field of inspection of the reader;

initiating a timer in response to said detecting; and generating a signal in response to the object being disposed in the field of inspection in excess of a predetermined amount of time, wherein said reader includes an antenna, a PSK receive path disposed between said antenna and a first circuit node, an FSK receive path disposed between said antenna and said first circuit node, and a first filter for attenuating a first RF frequency disposed between said first circuit node and a second circuit node, said PSK receive path includes a second filter for attenuating said first RF frequency and passing frequencies approximately one-half of said first RF frequency, and said FSK receive path includes a discriminator and a third filter, said third filter for attenuating frequencies approximately one-half of said first RF frequency and above and passing RF frequencies less than one-fourth of said first RF frequency.

10. A method for responding to the presentation of an object to a reader in an identification system, the object having certain predetermined characteristics readable by said reader, said method comprising:

detecting each presentation of the object to a field of inspection of said reader;

initiating a timer in response to a first detected presentation; and counting each presentation from said first detector presentation; and generating a signal in response to the object being presented to the field of inspection at least a predetermined number of times within a predetermined amount of time, wherein said reader includes an antenna, a PSK receive path disposed between said antenna and a first circuit node, an FSK receive path disposed between said antenna and said first circuit node, and a first filter for attenuating a first RF frequency disposed between said first circuit node and a second circuit node, said PSK receive path includes a second filter for attenuating said first RF frequency and passing frequencies approximately one-half of said first RF frequency, and said FSK receive path includes a discriminator and a third filter, said third filter for attenuating frequencies approximately one-half of said first RF frequency and above and passing RF frequencies less than one-fourth of said first RF frequency.

* * * * *